(12) United States Patent
Xia

(10) Patent No.: US 10,417,186 B2
(45) Date of Patent: Sep. 17, 2019

(54) FILE MIGRATION METHOD AND APPARATUS, AND STORAGE DEVICE

(71) Applicant: Huawei Technologies Co., Ltd., Shenzhen (CN)

(72) Inventor: Feng Xia, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 334 days.

(21) Appl. No.: 15/085,626

(22) Filed: Mar. 30, 2016

(65) Prior Publication Data

US 2016/0210302 A1 Jul. 21, 2016

Related U.S. Application Data

(63) Continuation of application No. PCT/CN2014/087572, filed on Sep. 26, 2014.

(51) Int. Cl.
*G06F 17/30* (2006.01)
*G06F 16/17* (2019.01)
(Continued)

(52) U.S. Cl.
CPC .......... *G06F 16/1724* (2019.01); *G06F 3/061* (2013.01); *G06F 3/065* (2013.01);
(Continued)

(58) Field of Classification Search
CPC ......... G06F 17/30135; G06F 17/30088; G06F 17/303; G06F 12/06; G06F 3/061; G06F 3/0619; G06F 3/0643; G06F 3/0647; G06F 3/065; G06F 3/067; G06F 3/1204; G06F 3/1222; G06F 3/1236; G06F 3/1238; G06F 3/1258; G06F 3/1285; G06F 3/1292; G06F 16/1724; G06F 16/214; G06F 16/128
See application file for complete search history.

(56) References Cited

U.S. PATENT DOCUMENTS

| 5,530,850 A | 6/1996 | Ford et al. |
| 7,228,384 B2 * | 6/2007 | Mizuno ................. G06F 9/52 370/389 |

(Continued)

FOREIGN PATENT DOCUMENTS

| CN | 101369967 A | 2/2009 |
| CN | 101520743 A | 9/2009 |

(Continued)

*Primary Examiner* — Huawen A Peng
(74) *Attorney, Agent, or Firm* — Leydig, Voit & Mayer, Ltd.

(57) ABSTRACT

A method for migrating a file in a storage device. The storage device obtains a snapshot of metadata of the file. The snapshot includes logical addresses of data blocks of the file and first write time points of the data blocks. The storage device identifies a logical address of a target data block and a first write time point of the target data block. Then, the storage device obtains a second write time point from the metadata of the file. The second write time point indicates a latest time point of writing the target data block into the storage device. If the first write time point of the target data block is identical to the second write time point, the storage device migrates the target data block to pre-allocated continuous storage space. Thereby, disk defragmentation can be achieved.

15 Claims, 8 Drawing Sheets

(51) Int. Cl.
*G06F 16/11* (2019.01)
*G06F 16/21* (2019.01)
*G06F 12/06* (2006.01)
*G06F 3/06* (2006.01)
*G06F 3/12* (2006.01)

(52) U.S. Cl.
CPC ............ *G06F 3/067* (2013.01); *G06F 3/0619* (2013.01); *G06F 3/0643* (2013.01); *G06F 3/0647* (2013.01); *G06F 3/1204* (2013.01); *G06F 3/1222* (2013.01); *G06F 3/1236* (2013.01); *G06F 3/1238* (2013.01); *G06F 3/1258* (2013.01); *G06F 3/1285* (2013.01); *G06F 3/1292* (2013.01); *G06F 12/06* (2013.01); *G06F 16/128* (2019.01); *G06F 16/214* (2019.01)

(56) References Cited

U.S. PATENT DOCUMENTS

| | | | |
|---|---|---|---|
| 7,958,168 B2 | 6/2011 | Chen | |
| 9,367,395 B1* | 6/2016 | Bono | G06F 16/174 |
| 9,720,619 B1* | 8/2017 | Shah | G06F 12/0253 |
| 9,891,860 B1* | 2/2018 | Delgado | G06F 3/065 |
| 2006/0242179 A1 | 10/2006 | Chen et al. | |
| 2006/0271605 A1* | 11/2006 | Petruzzo | G06F 11/2082 |
| 2009/0327631 A1 | 12/2009 | Yamada et al. | |
| 2011/0185120 A1 | 7/2011 | Jess | |
| 2012/0131274 A1 | 5/2012 | Craft | |
| 2012/0303918 A1 | 11/2012 | Reed et al. | |
| 2013/0238907 A1 | 9/2013 | Debout et al. | |
| 2014/0056137 A1 | 2/2014 | Kovvali et al. | |
| 2014/0289449 A1 | 9/2014 | Ogata | |

FOREIGN PATENT DOCUMENTS

| | | |
|---|---|---|
| CN | 101576890 A | 11/2009 |
| CN | 103562881 A | 2/2014 |
| CN | 103761053 A | 4/2014 |
| CN | 104159249 A | 11/2014 |
| JP | 2005535962 | 11/2005 |
| JP | 2010009290 | 1/2010 |
| JP | 2011154669 | 8/2011 |
| WO | 2014049678 | 4/2014 |

* cited by examiner

FILE MIGRATION METHOD AND APPARATUS, AND STORAGE DEVICE

CROSS-REFERENCE TO RELATED APPLICATIONS

This application is a continuation of International Application No. PCT/CN2014/087572, filed on 26 Sep. 2014, which is hereby incorporated by reference in its entirety.

TECHNICAL FIELD

Embodiments of the present invention relate to the field of storage technologies, and in particular, to a file migration method and apparatus, and a storage device.

BACKGROUND

A file system is a data structure for storing and organizing user data, and provides simple and convenient data access for a user. For a storage device providing a file system, storage space of a disk of the storage device is transparent to the user; the user does not need to care about a specific location of data stored in the disk, and may access the data merely by accessing a directory or a file.

A Redirect-On-Write (ROW) file system refers to a file system that writes data in a manner of redirect-on-write. When new user data is written or original user data is modified, the new data does not overwrite the original old data, and the data is written into newly-allocated space in the storage device. After the new data is written successfully, storage space of the old data is then released. However, as new data is constantly written, new storage space is constantly allocated in the storage device, and at the same time, storage space of old data is constantly released. However, new data cannot be written into the released storage space of the old data due to discreteness of the released storage space, causing a problem of storage space fragmentization in the disk. Therefore, it is necessary to defragment the storage space; defragmentation indicates organizing small discrete available storage space into large continuous storage space.

SUMMARY

Embodiments of the present invention provide a file migration method and apparatus, and a storage device, so that an target file can be migrated to pre-allocated continuous storage space, thereby achieving an objective of disk defragmentation.

A first aspect of the embodiments of the present invention provides a file migration method, where the method is applied to a storage device, the storage device stores an target file, the target file includes multiple data blocks, and the method includes:

obtaining, by the storage device, a snapshot of metadata of the target file, where the snapshot includes logical addresses of the multiple data blocks and first write time points of the multiple data blocks, and the first write time points indicate time points of writing the data block into the storage device that are recorded in the snapshot;

identifying a logical address of a target data block and a first write time point of the target data block from the logical addresses of the multiple data blocks and the first write time points of the multiple data blocks;

obtaining a second write time point corresponding to the logical address of the target data block from the metadata of the target file according to the logical address of the target data block, where the metadata of the target file includes the logical address of the target data block and the second write time point, and the second write time point indicates a latest time point of writing the target data block into the storage device; and migrating the target data block to pre-allocated continuous storage space when it is determined that the first write time point is the same as the second write time point.

With reference to the first aspect, in a first possible implementation manner, the method further includes:

pre-allocating the continuous storage space, where a size of the storage space is not less than a size of the target file.

With reference to the first aspect or the first possible implementation manner of the first aspect, in a second possible implementation manner, the method further includes:

allocating, in the storage space, a physical address to the target data block; and the migrating the target data block to pre-allocated continuous storage space includes: writing the target data block into storage space corresponding to the physical address.

With reference to the second possible implementation manner of the first aspect, in a third possible implementation manner, after the allocating, in the storage space, a physical address to the target data block, the method further includes:

storing, in the metadata of the target file, the physical address and a time point of writing the target data block into the storage space corresponding to the physical address.

With reference to the third possible implementation manner of the first aspect, in a fourth possible implementation manner, when the second write time point corresponding to the logical address of the target data block is obtained from the metadata of the target file according to the logical address of the target data block, the method further includes:

performing a lock operation on the logical address of the target data block and the second write time point, so that the logical address of the target data block and the second write time point cannot be modified after the second write time point corresponding to the logical address of the target data block is obtained and before the physical address and the time point of writing the target data block into the storage space corresponding to the physical address are stored in the metadata of the target file.

With reference to the first aspect or the first possible implementation manner of the first aspect to the fourth possible implementation manner of the first aspect, in a fifth possible implementation manner, the obtaining, by the storage device, a snapshot of metadata of the target file includes:

obtaining, by the storage device, the snapshot of the metadata of the target file when a preset time point arrives or a file migration instruction is received.

A second aspect of the embodiments of the present invention provides a file migration apparatus, where the apparatus is located in a storage device, the storage device stores an target file, the target file includes multiple data blocks, the apparatus includes a defragmentation module, and the defragmentation module includes:

a snapshot capture module, configured to obtain a snapshot of metadata of the target file, where the snapshot includes logical addresses of the multiple data blocks and first write time points of the multiple data blocks, and the first write time points indicate time points of writing the data blocks into the storage device that are recorded in the snapshot;

an address mapping module, configured to store the snapshot of the metadata of the target file and the metadata of the target file, where the snapshot capture module is further configured to identify a logical address of a target data block and a first write time point of the target data block from the logical addresses of the multiple data blocks and the first write time points of the multiple data blocks; and a migration module, configured to obtain a second write time point corresponding to the logical address of the target data block according to the logical address of the target data block from the metadata of the target file that is stored in the address mapping module, where the metadata of the target file includes the logical address of the target data block and the second write time point, and the second write time point indicates a latest time point of writing the target data block into the storage device, where the migration module is further configured to migrate the target data block to pre-allocated continuous storage space when it is determined that the first write time point is the same as the second write time point.

With reference to the second aspect, in a first possible implementation manner, the file migration apparatus further includes a space management module, configured to pre-allocate the continuous storage space, where a size of the storage space is not less than a size of the target file.

With reference to the second aspect or the first possible implementation manner of the second aspect, in a second possible implementation manner, the migration module is further configured to allocate, in the storage space, a physical address to the target data block; and the migration module is specifically configured to write the target data block into storage space corresponding to the physical address.

With reference to the second possible implementation manner of the second aspect, in a third possible implementation manner, the migration module is further configured to: after the physical address is allocated, in the storage space, to the target data block, store, in the metadata of the target file, the physical address and a time point of writing the target data block into the storage space corresponding to the physical address.

With reference to the third possible implementation manner of the second aspect, in a fourth possible implementation manner, the migration module is further configured to perform a lock operation on the logical address of the target data block and the second write time point, so that the logical address of the target data block and the second write time point cannot be modified after the second write time point corresponding to the logical address of the target data block is obtained and before the physical address and the time point of writing the target data block into the storage space corresponding to the physical address are stored in the metadata of the target file.

With reference to the second aspect or the first possible implementation manner of the second aspect to the fourth possible implementation manner of the second aspect, in a fifth possible implementation manner of the present invention, the defragmentation module further includes a trigger, where:

the trigger is configured to set a preset time point or receive a file migration instruction; and the snapshot capture module is specifically configured to obtain the snapshot of the metadata of the target file when the preset time point arrives or the file migration instruction is received.

A third aspect of the embodiments of the present invention provides a storage device, where the storage device includes a controller and a disk, and the controller includes a processor and a communication interface, where:

the communication interface is configured to communicate with the disk; and the processor is configured to obtain a snapshot of metadata of an target file, where the snapshot includes logical addresses of multiple data blocks and first write time points of the multiple data blocks, and the first write time points indicate time points of writing the data blocks into the disk that are recorded in the snapshot;

identify a logical address of a target data block and a first write time point of the target data block from the logical addresses of the multiple data blocks and the first write time points of the multiple data blocks;

obtain a second write time point corresponding to the logical address of the target data block from the metadata of the target file according to the logical address of the target data block, where the metadata of the target file includes the logical address of the target data block and the second write time point, and the second write time point indicates a latest time point of writing the target data block into the disk; and migrate the target data block to pre-allocated continuous storage space when it is determined that the first write time point is the same as the second write time point.

With reference to the third aspect, in a first possible implementation manner, the processor is further configured to pre-allocate the continuous storage space, where a size of the storage space is not less than a size of the target file.

With reference to the third aspect or the first possible implementation manner of the third aspect, in a second possible implementation manner, the processor is further configured to allocate, in the storage space, a physical address to the target data block; and the processor is specifically configured to write the target data block into storage space corresponding to the physical address.

With reference to the second possible implementation manner of the third aspect, in a third possible implementation manner, the processor is further configured to: after the physical address is allocated, in the storage space, to the target data block, store, in the metadata of the target file, the physical address and a time point of writing the target data block into the storage space corresponding to the physical address.

With reference to the third possible implementation manner of the third aspect, in a fourth possible implementation manner, the processor is further configured to perform a lock operation on the logical address of the target data block and the second write time point when the second write time point corresponding to the logical address of the target data block is obtained from the metadata of the target file according to the logical address of the target data block, so that the logical address of the target data block and the second write time point cannot be modified after the second write time point corresponding to the logical address of the target data block is obtained and before the physical address and the time point of writing the target data block into the storage space corresponding to the physical address are stored in the metadata of the target file.

With reference to the third aspect or the first possible implementation manner of the third aspect to the fourth possible implementation manner of the third aspect, in a fifth possible implementation manner of the present invention, the processor is specifically configured to obtain the snapshot of the metadata of the target file when a preset time point arrives or a file migration instruction is received.

In the embodiments of the present invention, a storage device obtains a snapshot of metadata of an target file, where the snapshot includes logical addresses of multiple data blocks and first write time points of the multiple data blocks, and the first write time points indicate time points of writing the data blocks into the storage device that are recorded in the snapshot; identifies a logical address of a target data block and a first write time point of the target data block from the logical addresses of the multiple data blocks and the first write time points of the multiple data blocks; obtains a second write time point corresponding to the logical address from the metadata of the target file according to the logical address, where the second write time point indicates a latest time point of writing the target data block into the storage device; and when it is determined that the first write time point is the same as the second write time point, it indicates that the target data block is not modified after the snapshot is generated, then the target data block is migrated to pre-allocated continuous storage space. In this way, the entire target file can be migrated to the continuous storage space, thereby achieving an objective of disk defragmentation.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

Embodiments of the present invention provide a file migration method, a file migration apparatus, and a storage device, so that an target file can be migrated to continuous storage space, thereby achieving an objective of defragmentation on storage space of a disk.

In the prior art, when defragmentation is performed on storage space in a unit of file, the file generally needs to be locked during a migration process, to prevent a user from modifying the file. The file includes several data blocks, and therefore, in the prior art, the file is unlocked only after the data blocks are migrated sequentially, which affects file access by the user. In the embodiments of the present invention, not only an objective of defragmentation can be achieved, but also the file may not be locked during the file migration process. A snapshot of metadata of the file is obtained, to further obtain a data block that is not modified after the snapshot is generated, and the data block is migrated to pre-allocated continuous storage space, so that the file migration process is transparent to the user.

In the embodiments of the present invention, the metadata of the file refers to data that describes file information, and includes information such as a logical address and physical address of a data block included in the file, a mapping relationship between the logical address and the physical address, and a time point of writing the data block into a storage device.

The following starts describing the embodiments of the present invention in detail.

Figure 1:
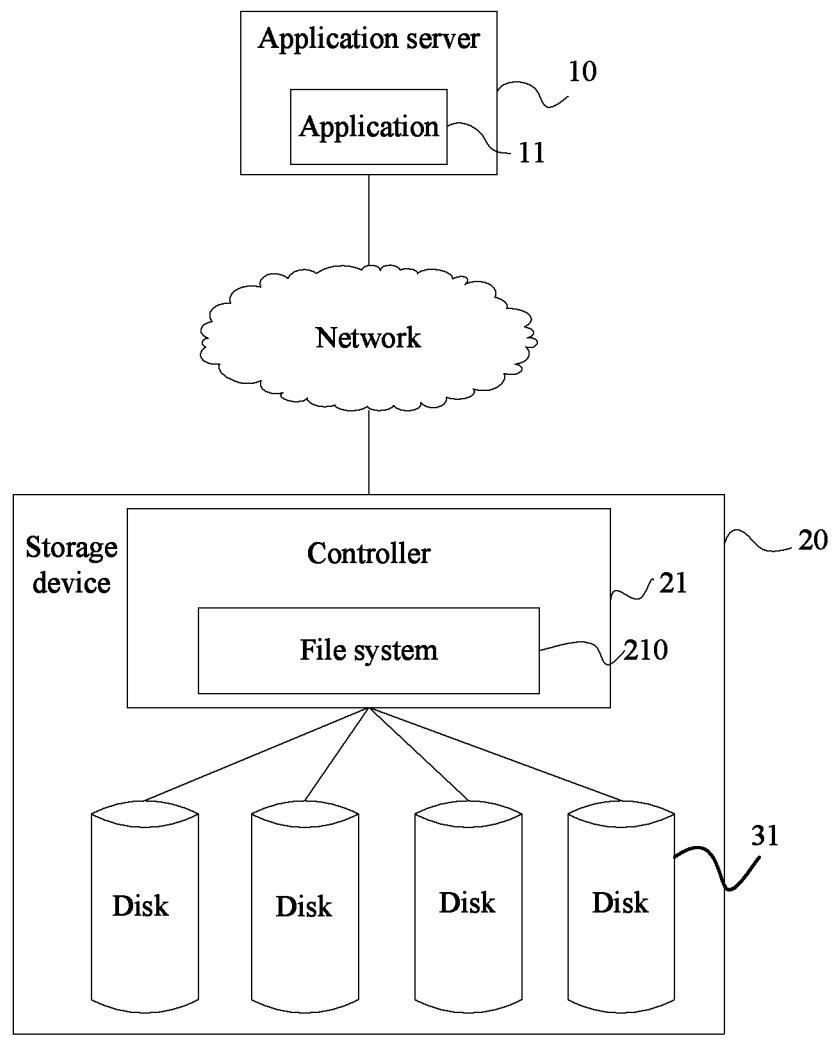
FIG. 1 is a diagram of composition of a storage system according to an embodiment of the present invention.

FIG. 1 is a diagram of composition of a storage system according to an embodiment of the present invention. The storage system shown in FIG. 1 includes at least one application server 10 and at least one storage device 20. The application server 10 may include any known computing device in the prior art, for example, a host, a server, or a desktop computer. An application 11 runs in the application server 10, and a user may send various file processing requests to the storage device 20 by using the application 11.

The storage device 20 may perform data transmission with the application 11 by using the: Network File System/Common Internet File System (NFS/CIFS) protocol on a network, and the storage device 20 may be any known storage device including a file system in the prior art, for example, a storage array or a storage server.

The storage device 20 includes a controller 21 and several disks 31. The controller 21 may include any known computing device in the prior art, for example, a server or a desktop computer. A file system 210 and another application are installed in the controller. The controller 21 is configured to perform various operations for file processing requests, such as a file creation operation, a file opening operation, a file read operation, and a file write operation. The several disks 31 included in the storage device 20 are configured to provide storage space for storing a file.

Figure 2:
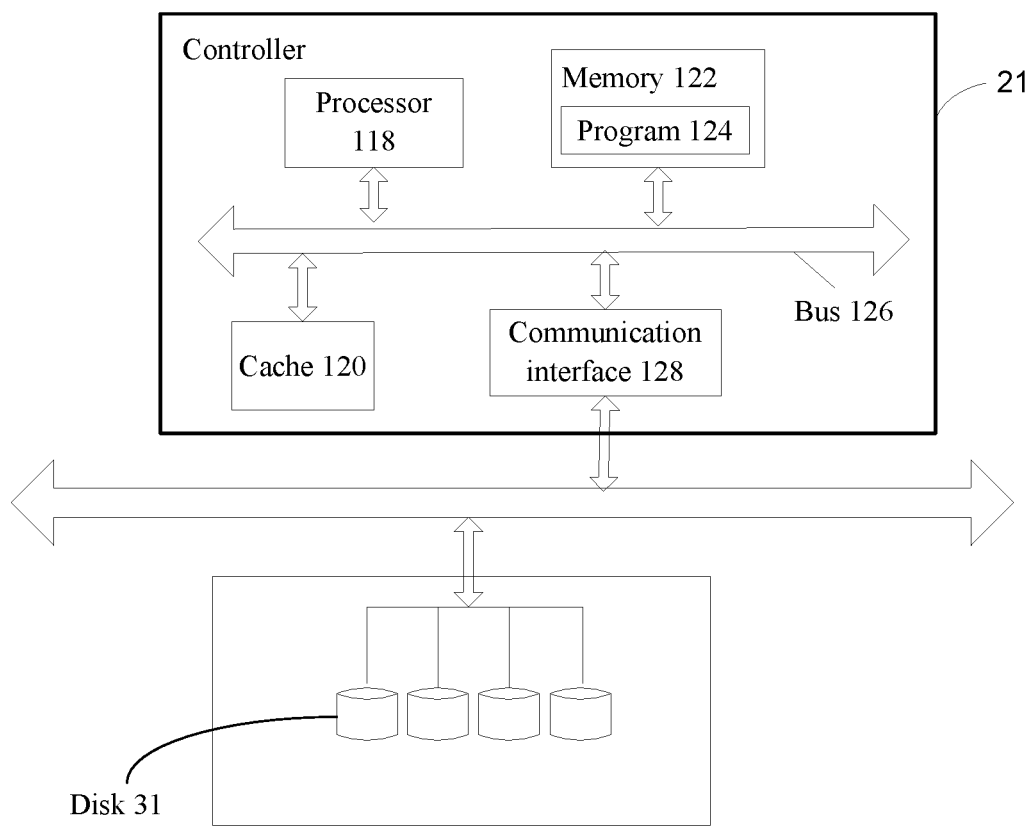
FIG. 2 is a structure of hardware of a controller according to an embodiment of the present invention.

The following describes a structure of hardware of the controller 21. Referring to FIG. 2, FIG. 2 is a structural diagram of the controller 21 in an embodiment of the present invention. As shown in FIG. 2, the controller 21 mainly includes a processor 118, a cache 120, a memory 122, a communications bus 126 and a communication interface 128. The processor 118, the cache 120, the memory 122, and the communication interface 128 communicate with each other by using the communications bus 126.

The communication interface 128 is configured to communicate with the application server 10 or the disks 31.

The memory 122 is configured to store a program 124, and the memory 122 may include a high-speed RAM memory, or may further include a non-volatile memory (non-volatile memory), for example, at least one disk memory. It may be understood that the memory 122 may be any non-transitory (non-transitory) machine-readable storage medium that can store program code, such as a random access memory (RAM), a magnetic disk, a hard disk, an optical disc, a solid state disk (SSD), or a non-volatile memory.

The program 124 may include program code, where the program code includes the file system 210 and other program code.

The cache 120 is configured to temporarily store data received from the application server 10 or data read from the disks 31. The cache 120 may be any non-transitory machine-readable storage medium that may store data, such as a RAM, a ROM, a flash memory, or a solid state disk, which is not limited herein.

In addition, the memory 122 and the cache 120 may be integrated or separately disposed, which is not limited in this embodiment of the present invention.

The processor 118 may be a central processing unit CPU or an application-specific integrated circuit Application Specific Integrated Circuit (ASIC), or may be configured as one or more integrated circuits that implement this embodiment of the present invention. In this embodiment of the present invention, the processor 118 may be configured to receive various file processing requests from the application server 10, and perform various operations, such as a file migration operation, a file read operation, and a file write operation, for the file processing requests by using the file system 210.

The file system 210 is a method for storing and organizing data of the storage device 20, facilitating data access and search. The file system 210 uses an abstract logical concept of a file and a tree directory to replace a concept of a data block that is used by a physical device, such as a disk. After the storage device 20 uses the file system 210 to store data, a user does not need to care about a disk address of a data block in which the data is actually stored, and only needs to memorize a directory and a file name to which the file belongs. Similarly, before writing new data, the user does not need to care about which address block is not used. A storage space management (allocation and release) function of the disk is automatically implemented by the file system 210, and the user only needs to memorize a file to which data is written. It should be noted that data stored in the storage device 20 is displayed to the user in a form of a file; however, a file stored in a disk 31 remains in a unit of a data block. Therefore, one file may include multiple data blocks.

The file system 210 in this embodiment is a Redirect-On-Write (ROW) file system. When new user data is written or original user data is modified, the new data does not overwrite the original old data, and the new data is written into newly-allocated space in the storage device 20. After the new data is written successfully, storage space of the old data is then released. However, as new data is constantly written, new storage space is constantly allocated in disk space of the storage device 20, and original continuous user data becomes discrete due to multiple modifications, thereby affecting access performance of the data. Therefore, a defragmentation module is added to the file system 210 in this embodiment, to perform defragmentation on the disk space of the storage device 20.

Figure 3:
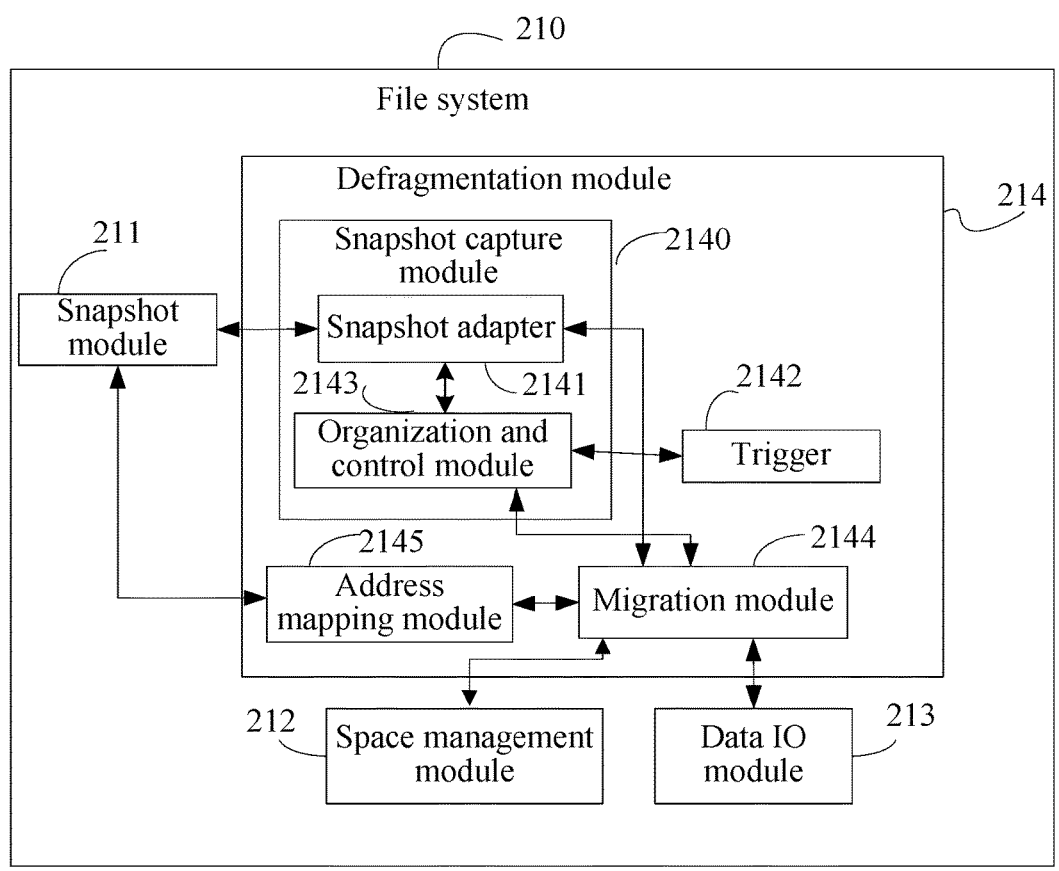
FIG. 3 is a schematic diagram of a logical structure of a file system according to an embodiment of the present invention.

The following describes a logical structure of the file system 210. Referring to FIG. 3, a schematic diagram of a logical structure of the file system 210 according to an example embodiment is shown. As shown in FIG. 3, the file system 210 mainly includes: a defragmentation module 214 and a space management module 212. The defragmentation module 214 is configured to migrate a data block included in a target file; and the space management module 212 is configured to pre-allocate one piece of continuous storage space, to store the migrated data block.

Specifically, the defragmentation module 214 may include a snapshot capture module 2140, an address mapping module 2145, and a migration module 2144. The snapshot capture module 2140 is configured to obtain a snapshot of metadata of the target file; the address mapping module 2145 is configured to store the snapshot of the metadata of the target file and the metadata of the target file; the migration module 2144 is configured to search the address mapping module 2145 for the metadata of the target file, and the migration module 2144 is further configured to migrate data included in the target file to the pre-allocated continuous storage space.

Further, the snapshot capture module 2140 may include an organization and control module 2143 and a snapshot adapter 2141. The organization and control module 2143 is configured to control an entire defragmentation procedure, and implement a defragmentation function by coordinating work of other modules; the snapshot adapter 2141 may be configured to generate the snapshot of the metadata of the target file. However, in some scenarios, when the file system 210 already includes a module (for example, a snapshot module 211) that is configured to generate a snapshot, the snapshot adapter 2141 may be merely configured to perform data exchange with the snapshot module 211. For example, the snapshot adapter 2141 sends a snapshot request to require the snapshot module 211 to generate a snapshot and store information about the snapshot.

In addition, optionally, the defragmentation module 214 may further include a trigger 2142. The trigger 2142 is used to start defragmentation, and provides defragmentation timing and a defragmentation policy for the file system 210. Specifically, a timer may be set in the trigger 2142, and a defragmentation task is started when a preset time point is reached. Alternatively, another trigger condition is set, and a defragmentation task is started when a preset condition is met. In addition, the trigger 2142 is further configured to receive a file migration instruction, a defragmentation instruction, or a similar instruction, to start the defragmentation task. In addition, the defragmentation policy is configured in the trigger 2142. For example, defragmentation is performed in a unit of file, defragmentation is performed in a unit of a directory, or defragmentation is performed in a unit of all files.

Optionally, the file system 210 may further include a data IO module 213, configured to implement functions of reading and writing data stored in the disks 31. For example, when determining a to-be-migrated data block, the migration module 2144 may send the data block to the data IO module 213, and the data IO module 213 writes the data block into the continuous storage space pre-allocated by the space management module 212. After the data block is written successfully, new metadata may be stored in the address mapping module 2145. The new metadata herein includes information such as a logical address of the data block, a physical address of storage space into which the data block is written, a mapping relationship between the logical address and the physical address, and a time point of writing the data block. It should be noted that, after migration, the physical address of the data block changes while the logical address of the data block remains unchanged. However, the physical address is invisible to the application server 10, and therefore, a migration process of the data block and even of an entire file is transparent to the application server 10.

It may be understood that the file system 210 may further include other function modules, which are not discussed in the description of the current embodiment.

It should be noted that, in the embodiment shown in FIG. 3, the file system 210 includes both the snapshot adapter 2141 and the snapshot module 211. The snapshot module 211 is configured to perform a snapshot generation operation; the snapshot adapter 2141 is configured to perform data exchange with the snapshot module 211, to require the snapshot module 211 to generate a snapshot and store information about the snapshot, and the like. However, in some scenarios, a function of the snapshot module 211 may be integrated in the snapshot adapter 2141, and the snapshot adapter 2141 performs the snapshot generation operation. In conclusion, module division of the file system 210 shown in FIG. 3 is merely an exemplary description of this embodiment of the present invention, and any module that can implement the foregoing functions shall fall within the protection scope of this embodiment of the present invention.

In one embodiment, the address mapping module 2145 may use an address mapping tree (for example, a B+ tree) to manage the mapping relationship between the logical address and the physical address.

Figure 4:
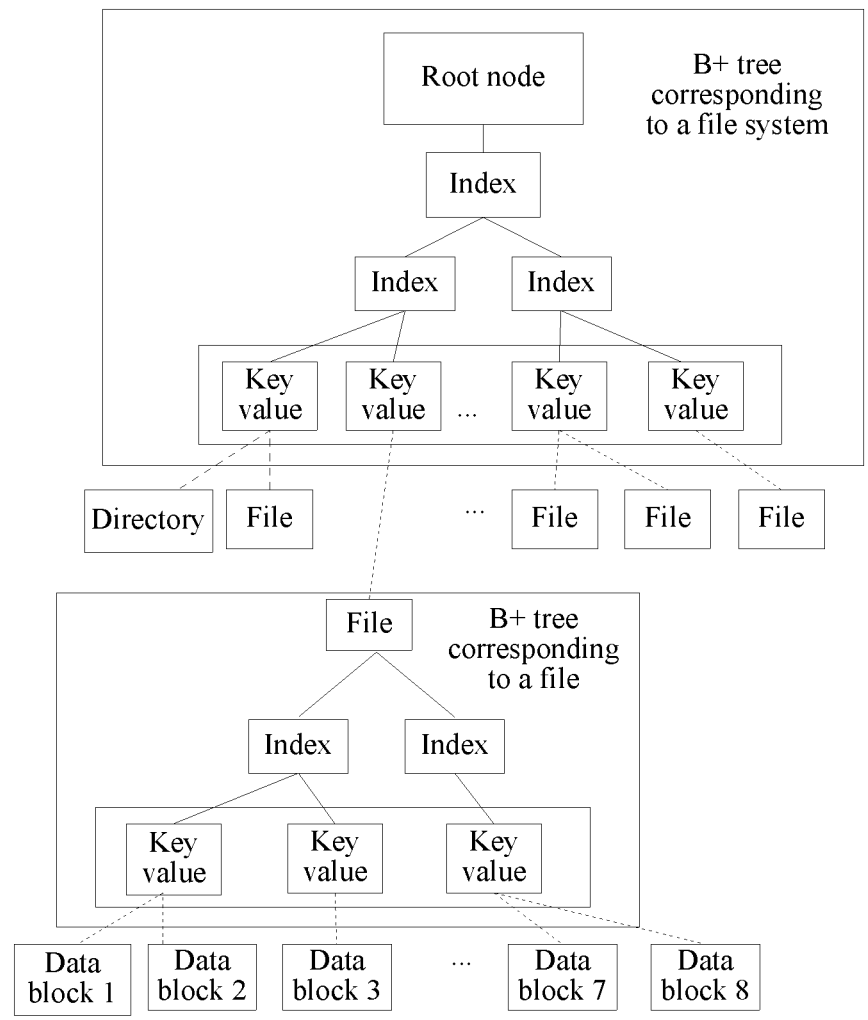
FIG. 4 is a schematic diagram of a B+ tree of metadata of a file according to an embodiment of the present invention.

FIG. 4 is a schematic diagram of a B+ tree corresponding to a file system.

It should be noted that the B+ tree corresponding to the file system herein refers to a B+ tree that is used to manage metadata of all files in the storage device. The B+ tree includes a root node, indexes at various levels, and multiple leaf nodes, where the root node is an ingress of the B+ tree, and the B+ tree may be entered through the root node. Each leaf node stores a key-value (KV) pair. In this embodiment, specific definitions of a Key field and a Value field are shown in the following table:

| | |
|---|---|
| Key | Logical address |
| Value | Write time point |
| | Physical address |

The Key field is used to store a logical address that is also called a logical offset or a logical start address; the Value field stores a two part—content: one part being a write time point and the other part being a physical address. The physical address is a specific location of a data block, which is stored in a disk and to which the logical address is directed; the write time point indicates a time point of writing, into the disk, the data block to which the logical address is directed. A representation form of the write time point may be a serial number of 64 bits, or numbers or letters representing a sequence, or another manner; a form of the write time point is not limited in this embodiment of the present invention. In addition, it may be understood that the write time point may be a time point allocated before the data block to which the logical address is directed is written into the disk, but is not necessarily an actual time point of writing the data block into the disk.

It may be known from FIG. 4 that the Value field stores a physical address, and each physical address may be directed to metadata of a file or metadata of a directory; therefore, a sub-tree of a file (a B+ tree corresponding to the file) may be obtained by using the B+ tree corresponding to the file system. Similarly, the B+ tree corresponding to the file also includes indexes at various levels and multiple leaf nodes, where each leaf node stores a KV pair, and definitions of the Key field and the Value field are the same as those shown in the foregoing table. One file is formed by multiple data blocks, and therefore, a physical address stored in the Value field in the sub-tree of the file may be directed to metadata of one or more data blocks.

Figure 5:
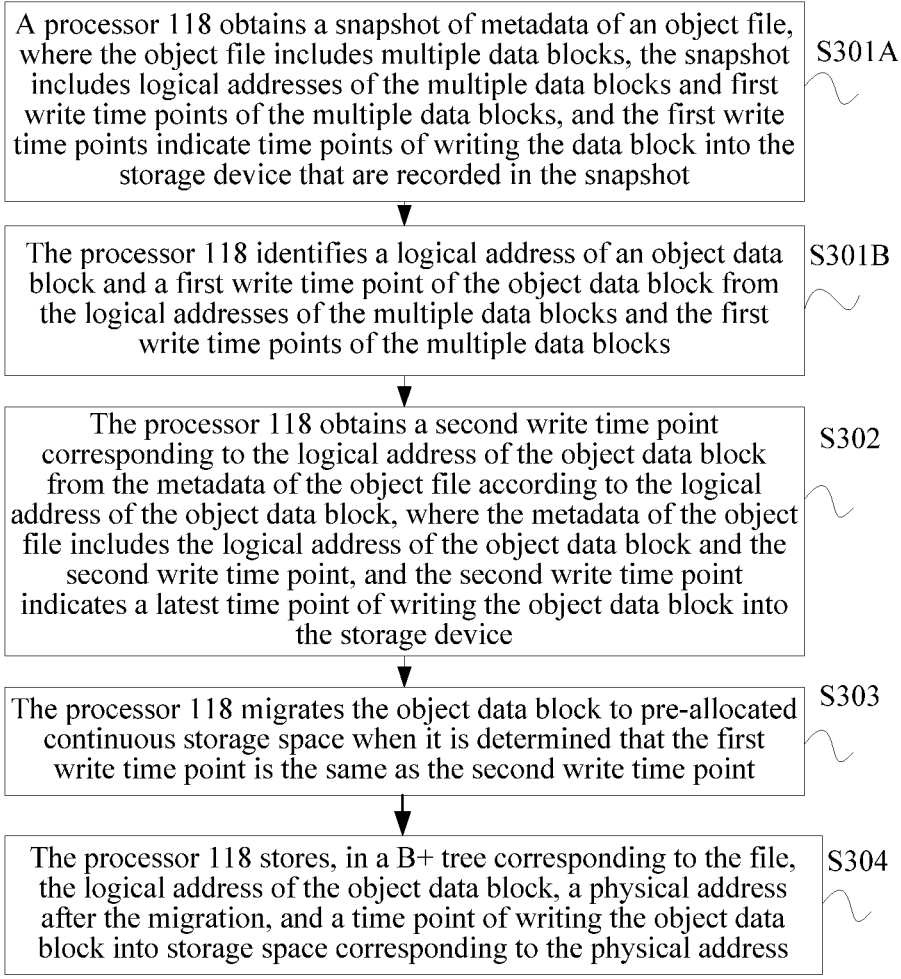
FIG. 5 is a schematic flowchart of a file migration method according to an embodiment of the present invention.

The following describes a procedure of a file migration method in an embodiment of the present invention. The file migration method in this embodiment of the present invention may be applied to the storage device shown in FIG. 2. FIG. 5 is a flowchart of the file migration method according to an exemplary embodiment of the present invention. As shown in FIG. 5, the method includes:

Step S301A: A processor 118 obtains a snapshot of metadata of an target file, where the target file includes multiple data blocks, the snapshot includes logical addresses of the multiple data blocks and first write time points of the multiple data blocks, and the first write time points indicate time points of writing the data block into the storage device that are recorded in the snapshot.

Referring to the B+ tree shown in FIG. 4, the metadata of the target file is stored in a B+ tree corresponding to a file, and each leaf node of the B+ tree stores a Key-Value (KV) pair, where a Key field is used as a retrieval value to store a logical address of each data block; a Value field is used as a value to store a physical address of each data block and a time point of writing each data block into a storage device 20.

Optionally, step S301A may be performed when a preset time point arrives or a file migration instruction is received. For details, refer to the trigger 2142 in FIG. 3 and related descriptions, and details are not described herein again.

Figure 6:
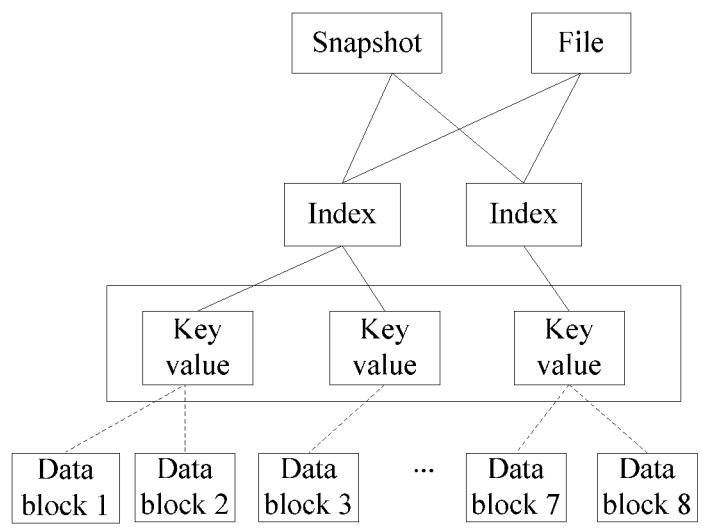
FIG. 6 is a schematic diagram of a B+ tree of a snapshot of metadata of a file according to an embodiment of the present invention.

In step S301A, the processor 118 needs to generate the snapshot of the metadata of the target file. The snapshot refers to an image of corresponding data at a specific write time point (a write time point of starting copy). After the snapshot is generated, a freeze-frame image may be generated for the metadata of the target file, where the image is not modified. With reference to FIG. 4, the metadata of the target file is organized according to the B+ tree corresponding to the file shown in FIG. 4. The snapshot of the metadata of the target file is another B+ tree of a freeze-frame B+ tree corresponding to the file, as shown in FIG. 6. When the snapshot is generated at the very beginning, the data block is temporarily not modified; therefore, the leaf node may be shared although a root node of the B+ tree (B+ tree corresponding to the file for short) corresponding to the metadata of the target file is different from that of a B+ tree corresponding to the snapshot.

However, after the snapshot is generated, the processor 118 may receive a modification request for the data block, where the modification request is used to modify the data block. A modification manner of the processor 118 is: allocating one piece of new storage space to a modified data block, and writing the modified data block into the newly-allocated storage space, and after the modified data block is written successfully, releasing storage space in which the data block before the modification is located.

Then, correspondingly, the processor 118 may generate a KV according to the modification request, and add a new leaf node in the B+ tree corresponding to the file, to store the newly-generated KV. In this case, a Key field in the newly-generated KV still stores a logical address of the modified data block. A physical address in a Value field is an address of the newly-allocated storage space in which the modified data block is stored, and a write time point in the Value field indicates a time point of writing the modified data block into the newly-allocated storage space. Because the logical address is unchanged, the write time point is a latest write time point of a data block to which the logical address is directed. It may be understood that the new leaf node is the leaf node of the B+ tree corresponding to the file, and is not shared with the B+ tree corresponding to the snapshot. Therefore, although the B+ tree corresponding to the file and the B+ tree corresponding to the snapshot share some leaf nodes, a meaning indicated by the write time point stored in the Value field of the B+ tree corresponding to the file is different from that indicated by the write time point stored in the B+ tree corresponding to the snapshot. To differentiate the two write time points, in this embodiment, the write time point stored in the B+ tree corresponding to the snapshot is called a first write time point, and the write time point stored in the B+ tree corresponding to the file is called a second write time point. The first write time point indicates a time point of writing the data block into the storage device that is recorded in the snapshot, and the second write time point indicates a latest write time point of the data block.

Step S301B: The processor 118 identifies a logical address of a target data block and a first write time point of the target data block from the logical addresses of the multiple data blocks and the first write time points of the multiple data blocks.

In this embodiment, for ease of description, one data block in the target file is used as an example to describe a migration procedure, and the data block is called the target data block. It may be understood that, other data blocks in the target file except the target data block are also migrated by using a same method.

Because the B+ tree corresponding to the snapshot stores a KV of each data block included in the target file, after the B+ tree corresponding to the snapshot is obtained, the KV of each data block included in the target file is obtained. The processor 118 may perform scanning on the KV corresponding to each data block, to obtain a KV corresponding to the target data block. The Key field includes the logical address of the target data block, and the Value field includes the first write time point of the target data block.

Step S302: The processor 118 obtains a second write time point corresponding to the logical address of the target data block from the metadata of the target file according to the logical address of the target data block, where the metadata of the target file includes the logical address of the target data block and the second write time point, and the second write time point indicates a latest time point of writing the target data block into the storage device.

In step S302, the metadata of the target file refers to the B+ tree corresponding to the file. In step S301A, the logical address of the target data block is obtained, and therefore, a KV corresponding to the logical address may be obtained by searching the B+ tree corresponding to the file according to the logical address. The Key field is used to store the logical address, and the Value field is used to store the second write time point (referring to the description in step S301A); therefore, the second write time point may be further obtained.

Step S303: The processor 118 migrates the target data block to pre-allocated continuous storage space when it is determined that the first write time point is the same as the second write time point.

Specifically, after the processor 118 obtains the first write time point and the second write time point, it may be determined whether the two are the same. If the two are the same, it indicates that the target data block is not modified after the snapshot is generated, and therefore, the target data block may be migrated to the pre-allocated continuous storage space; if the two are different, it indicates that the target data block is modified after the snapshot is generated and that modified data block is already written into new storage space, and such a target data block does not need to be migrated.

Therefore, the pre-allocated continuous storage space may be allocated before step S301A is performed, or may be allocated after step S301A and before step S303. Specifically, a size of the continuous space needs to be not less than a size of the target file, so that there is enough space to store migrated data blocks of the target file, thereby achieving an objective of defragmentation. An allocation manner of the storage space may be: allocating enough storage space once; or allocating the storage space by multiple times, where a total size of the allocated storage space is not less than the size of the target file.

In this embodiment of the present invention, a storage device obtains a snapshot of metadata of an target file, where the snapshot includes logical addresses and first write time points of multiple data blocks, and the first write time points indicate time points of writing the data block into the storage device that are recorded in the snapshot; identifies a logical address of a target data block and a first write time point of the target data block from the logical addresses of the multiple data blocks and the first write time points of the multiple data blocks; obtains a second write time point corresponding to the logical address from the metadata of the target file according to the logical address, where the second write time point indicates a latest time point of writing the target data block into the storage device; and migrates the target data block to pre-allocated continuous storage space when the first write time point is the same as the second write time point, which indicates that the target data block is not modified after the snapshot is generated, thereby achieving an objective of disk defragmentation. In addition, in this embodiment of the present invention, the target file does not need to be locked during a migration process; the snapshot of the metadata of the target file is obtained to obtain a data block that is not modified after the snapshot is generated, and the data block that is not modified is migrated to the pre-allocated continuous storage space. To some extent, during the file migration process in this embodiment of the present invention, file access by a user may not be affected, thereby improving file access efficiency.

In the foregoing step S303, the pre-allocated continuous storage space is large continuous storage space and the size of the pre-allocated storage space is not less than the size of the target file. Therefore, before the target data block is written into the pre-allocated continuous storage space, a physical address needs to be allocated, in the storage space, to the target data block, and after the physical address is allocated, the target data block is written into storage space corresponding to the physical address.

Then, correspondingly, the file migration method shown in FIG. 5 may further include:

Step S304: The processor 118 stores, in a B+ tree corresponding to the file, the logical address of the target data block, a physical address after the migration, and a time point of writing the target data block into the storage space corresponding to the physical address.

It may be understood that the time point of writing the target data block into the storage space corresponding to the physical address herein indicates a latest time point of writing the target data block into the storage device, that is, the second write time point described above.

With reference to FIG. 6, step S304 may be specifically: generating a new leaf node and adding the new leaf node to the B+ tree corresponding to the file, and modifying indexes at various levels between the new leaf node and the root node of the B+ tree corresponding to the file. The new leaf node is used to store a new KV, where a Key field is used to store the logical address, and a Value field is used to store the physical address after the migration and the time point of writing the target data block into the storage space corresponding to the physical address. It should be noted that the time point herein may not be a time point in a strict sense, but an allocated serial number or another form.

Further, the file migration method shown in FIG. 5 may further include:

When obtaining the second write time point corresponding to the logical address from the metadata of the target file according to the logical address, the processor 118 performs a lock operation on the logical address and the second write time point, so that the logical address and the second write time point cannot be modified after the second write time point corresponding to the logical address is obtained and before the physical address is allocated, in the storage space, to the target data block.

In this embodiment, the performing a lock operation on the logical address and the second write time point may be specifically: in the B+ tree corresponding to the file, performing the lock operation on a leaf node in which a KV corresponding to the logical address is located. An objective of performing the lock operation is to prevent the target data block from being modified. A specific lock operation may be implemented by using various existing lock algorithms, and details are not discussed herein.

Correspondingly, this embodiment may further include: performing, by the processor 118, an unlock operation on the logical address and the second write time point. After the unlock operation is performed, the target data block may be modified.

It should be noted that timing for the unlocking is not limited in this embodiment, provided that the unlock operation is performed after step S304. The unlock operation may be performed before the processor 118 writes the target data block into the storage space corresponding to the physical address; or may be performed after the processor 118 writes the target data block into the storage space corresponding to the physical address.

It may be understood that during a period between performing the lock operation on the logical address and the second write time point and performing the unlock operation on the logical address and the second write time point, the logical address and the second write time point, as the metadata of the target data block, cannot be modified, which means that the target data block cannot be modified. For example, during this period, when the processor 118 receives a modification request that is used to modify the target data block, execution of the modification request is suspended before the unlock operation is performed on the logical address and the second write time point. It should be noted that the modification request is merely an example in this embodiment of the present invention, and execution of another access request, for example, a read request, is also suspended.

However, for the target file, although the target data block cannot be modified during the period between performing the lock operation on the logical address and the second write time point and performing the unlock operation on the logical address and the second write time point, a modification request or another access request for another data block except the target data block may still be received. In this embodiment of the present invention, a locked object is the metadata of the target data block, and another data block is not affected. In this way, by using the file migration method in this embodiment of the present invention, user access of a migrated file is not affected as far as possible, thereby improving user experience.

Migrating one data block in an target file is used as an example to describe the file migration method shown FIG. 5. After migration of all data blocks in the target file is complete in a same manner, defragmentation work in a unit of an target file is also complete.

The unit of Disk space defragmentation work may be a file or a directory. A defragmentation procedure in a unit of a directory is similar to a defragmentation procedure in a unit of a file shown in FIG. 5, and details are not described herein again.

In addition, all files stored in the storage device 20 may also be used as a unit of the disk space defragmentation work. In this scenario, the method procedure shown in FIG. 5 may be performed circularly, until migration of all the files is complete. Alternatively, to reduce a system resource, in step S301A, snapshots of metadata (that is, the B+ tree corresponding to the file system shown in FIG. 4) of all files may be obtained, and then a KV of each data block of each file that is recorded in the snapshots is obtained sequentially, until migration of all data blocks is complete. A specific procedure thereof is similar to that in the embodiment shown in FIG. 5, and details are not described herein again.

With reference to FIG. 3, the following describes a file migration apparatus according to an embodiment of the present invention. The apparatus is located in a storage device, the storage device stores an target file, the target file includes multiple data blocks, and the file migration apparatus has a same structure as the file system 210 shown in FIG. 3. Specifically, the file migration apparatus includes a defragmentation module 214, where the defragmentation module 214 includes a snapshot capture module 2140, an address mapping module 2145, and a migration module 2144.

The snapshot capture module 2140 is configured to obtain a snapshot of metadata of the target file, where the snapshot includes logical addresses of the multiple data blocks and first write time points of the multiple data blocks, and the first write time points indicate time points of writing the data block into the storage device that are recorded in the snapshot.

The address mapping module 2145 is configured to store the snapshot of the metadata of the target file and the metadata of the target file.

The snapshot capture module 2140 is further configured to identify a logical address of a target data block and a first write time point of the target data block from the logical addresses of the multiple data blocks and the first write time points of the multiple data blocks.

The migration module 2144 is configured to obtain a second write time point corresponding to the logical address of the target data block from the metadata of the target file that is stored in the address mapping module according to the logical address of the target data block, where the metadata of the target file includes the logical address of the target data block and the second write time point, and the second write time point indicates a latest time point of writing the target data block into the storage device.

The migration module 2144 is further configured to migrate the target data block to pre-allocated continuous storage space when it is determined that the first write time point is the same as the second write time point.

Optionally, the file migration apparatus further includes a space management module 212, configured to pre-allocate the continuous storage space, where a size of the storage space is not less than a size of the target file.

Optionally, the migration module 2144 is further configured to allocate, in the storage space, a physical address to the target data block; the migration module 2144 is further configured to: after the physical address is allocated, in the storage space, to the target data block, store, in the metadata of the target file, the physical address and a time point of writing the target data block into storage space corresponding to the physical address.

Optionally, the migration module 2144 is further configured to perform a lock operation on the logical address of the target data block and the second write time point, so that the logical address of the target data block and the second write time point cannot be modified after the second write time point corresponding to the logical address of the target data block is obtained and before the physical address and the time point of writing the target data block into the storage space corresponding to the physical address are stored in the metadata of the target file.

Optionally, the defragmentation module 214 further includes a trigger 2142.

The trigger 2142 is configured to set a preset time point or receive a file migration instruction.

Correspondingly, the snapshot capture module 2140 is specifically configured to obtain the snapshot of the metadata of the target file when the preset time point arrives or the file migration instruction is received.

With reference to FIG. 3, the following uses a specific example to describe how modules coordinate with each other to implement defragmentation work.

Figure 7A:
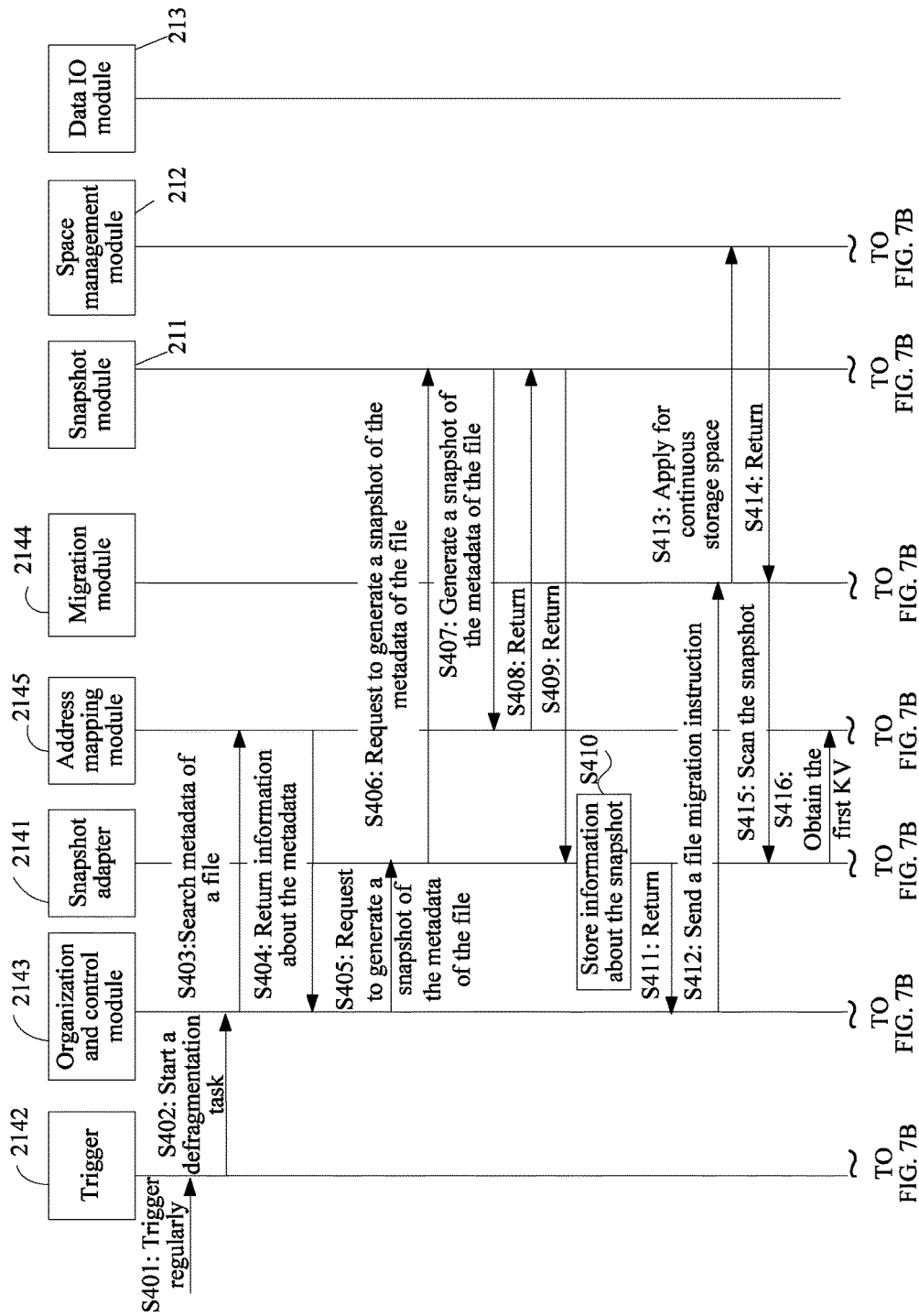
FIG. 7A and FIG. 7B are a schematic flowchart of defragmentation in a unit of a file according to an embodiment of the present invention.
Figure 7B:
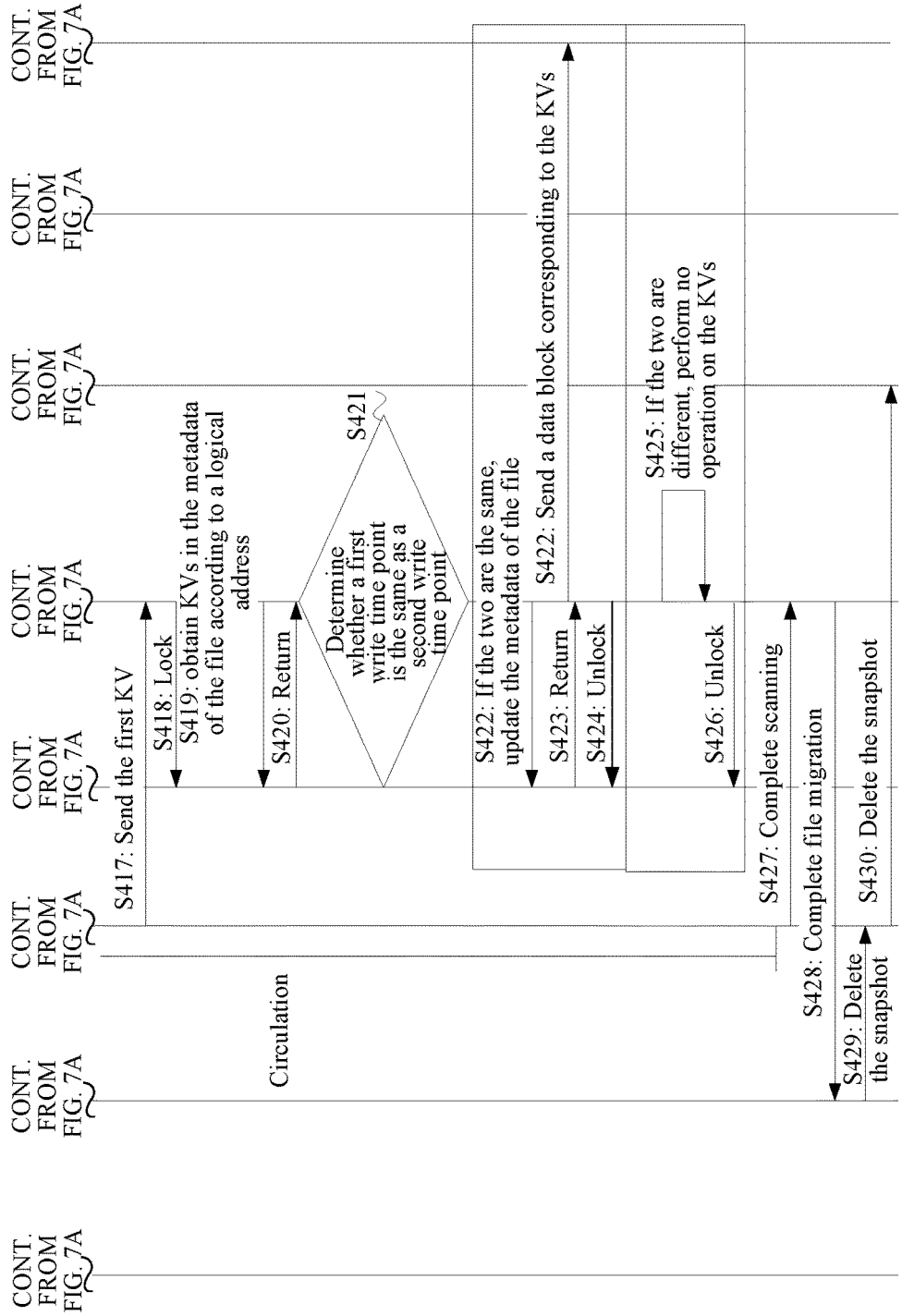

Referring to FIG. 7A and FIG. 7B, FIG. 7A and FIG. 7B are a schematic flowchart of defragmentation in a unit of a file. A file described in the following steps may be the target file in the file migration procedure shown in FIG. 5, and definitions and functions of the modules described in the following steps are the same as those of the modules shown in FIG. 3. As shown in FIG. 7A and FIG. 7B, the method includes:

Step S401: A defragmentation task is triggered regularly.

For example, a user may trigger the defragmentation task regularly by using a timer, or a user manually starts the defragmentation task.

Step S402: A trigger 2142 sends an instruction to an organization and control module 2143, to instruct the organization and control module 2143 to start the defragmentation task.

Step S403: The organization and control module 2143 sends a query instruction to an address mapping module 2145, to request to search an address mapping tree stored in the address mapping module 2145 for metadata of a file.

Specifically, the metadata of the file in the address mapping tree may be a B+ tree corresponding to the file shown in FIG. 4 or FIG. 6.

Step S404: The address mapping module 2145 returns information about the metadata of the file to the organization and control module 2143, where the information may be location information of the metadata of the file in a file system.

Step S405: The organization and control module 2143 sends a snapshot generating instruction to a snapshot adapter 2141, to request to generate a snapshot of the metadata of the file, where the snapshot generating instruction may include the information about the metadata of the file.

Step S406: The snapshot adapter 2141 forwards the snapshot generating instruction to a snapshot module 211.

Step S407: The snapshot module 211 accesses the address mapping module 2145, to generate the snapshot of the metadata of the file and store the snapshot in the address mapping module 2145.

Specifically, the snapshot module 211 may find the metadata of the file in the address mapping module 2145 according to the information about the metadata of the file, and generate the snapshot. For a manner of generating the snapshot, refer to the description in step S301A in a file migration procedure shown in FIG. 5, and details are not described herein again.

Step S408: The address mapping module 2145 returns a response request of the snapshot generating instruction to the snapshot module 211, to indicate that the snapshot of the metadata of the file has been generated and stored successfully.

In addition, the response request includes information about the snapshot, where the information about the snapshot includes information such as an address of the snapshot stored in the address mapping module 2145.

Step S409: The snapshot module 211 returns a response request of the snapshot generating instruction to the snapshot adapter 2141, to indicate that the snapshot of the metadata of the file has been generated and stored successfully.

In addition, the response request includes the information about the snapshot in step S408.

Step S410: The snapshot adapter 2141 stores the information about the snapshot.

Step S411: The snapshot adapter 2141 returns a response request of the snapshot generating instruction to the organization and control module 2143, to indicate that the snapshot has been generated and stored successfully.

Step S412: The organization and control module 2143 sends a file migration instruction to a migration module 2144.

Step S413: The migration module 2144 sends a space application instruction to a space management module 212, to apply for continuous storage space, where a size of the continuous storage space is not less than a size of the file.

Specifically, for implementation of this step, refer to the description in step S303 in the file migration procedure shown in FIG. 5, and details are not described herein again.

Step S414: The space management module 212 returns a response request of the space application instruction to the migration module 2144, to indicate that the storage space has been successfully allocated.

Step S415: The migration module 2144 sends a scanning request to the snapshot adapter 2141, to request to scan the snapshot.

Step S416: The snapshot adapter 2141 sends a query instruction to the address mapping module 2145, to obtain the first KV.

Specifically, the query instruction includes the information about the snapshot. The information about the snapshot includes the address of the snapshot stored in the address mapping module 2145, and therefore, the address mapping module 2145 may send the snapshot of the metadata of the file to the snapshot adapter 2141 according to the address. It may be seen that, in step S301A of the embodiment shown in FIG. 5, the snapshot of the metadata of the file refers to a B+ tree corresponding to the snapshot, and the snapshot adapter 2141 may start searching from a root node of the B+ tree, to obtain a KV (the first KV for short) of the first data block. For a KV of a data block, refer to the description of the KV corresponding to the target data block in step S301A in the file migration procedure shown in FIG. 5, and details are not described herein again.

Step S417: The snapshot adapter 2141 sends the first KV to the migration module 2144.

Step S418: The migration module 2144 performs lock operation on KVs in the metadata of the file.

Step S419: The migration module 2144 sends a query instruction to the address mapping module 2145, to obtain the KVs in the metadata of the file.

A Key field of the first KV stores a logical address, and therefore, the migration module 2144 may query the address mapping module 2145 according to the logical address, to obtain KVs in metadata of a file corresponding to the logical address.

For details, refer to the description in step S302 in the file migration procedure shown in FIG. 5, and details are not described herein again.

Step S420: The address mapping module 2145 returns the KVs in the metadata of the file corresponding to the obtained logical address to the migration module 2144.

Step S421: The migration module 2144 determines whether a first write time point is the same as the second write time point.

For details, refer to the description in step S303 in the file migration procedure shown in FIG. 5, and details are not described herein again.

Step S422: If the first write time point and the second write time point are the same, the migration module 2144 sends an updated instruction to the address mapping module 2145, to update the metadata of the file.

For details, refer to the description in step S304 in the file migration procedure shown in FIG. 5, and details are not described herein again.

Step S423: The address mapping module 2145 returns a response request of the updated instruction to the migration module 2144, to indicate that the metadata of the file has been updated successfully.

Step S424: The migration module 2144 performs an unlock operation on the KVs in the metadata of the file.

For details, refer to the description in the file migration procedure shown in FIG. 5, and details are not described herein again.

In addition, if the first write time point and the second write time point are different, perform step S425: perform no operation the KVs; and perform step S426: unlock the KVs.

It should be noted that step S416 to step S426 are performed circularly, until all the KVs are processed.

After all the KVs have been processed, perform step S427: the snapshot adapter 2141 sends a scanning completion instruction to the migration module 2144.

Step S428: The migration module 2144 feeds back to the organization and control module 2143 that file migration is complete.

Step S429: The organization and control module 2143 sends a snapshot deletion instruction to the snapshot adapter 2141.

Step S430: The snapshot adapter 2141 forwards the snapshot deletion instruction to the snapshot module 211, to delete the snapshot of the metadata of the file.

In this embodiment of the present invention, a storage device obtains a snapshot of metadata of an target file, where the snapshot includes logical addresses and first write time points of multiple data blocks, and the first write time points indicate time points of writing the data block into the storage device that are recorded in the snapshot; identifies a logical address of a target data block and a first write time point of the target data block from the logical addresses of the multiple data blocks and the first write time points of the multiple data blocks; obtains a second write time point corresponding to the logical address from the metadata of the target file according to the logical address, where the second write time point indicates a latest time point of writing the target data block into the storage device; and migrates the target data block to pre-allocated continuous storage space when the first write time point is the same as the second write time point, which indicates that the target data block is not modified after the snapshot is generated, thereby achieving an objective of disk defragmentation. In addition, in this embodiment of the present invention, the target file does not need to be locked during a migration process; the snapshot of the metadata of the target file is obtained to obtain a data block that is not modified after the snapshot is generated, and the data block that is not modified is migrated to the pre-allocated continuous storage space. To some extent, during the file migration process in this embodiment of the present invention, file access by a user may not be affected, thereby improving file access efficiency.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM) or flash memory, an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may actually be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

I claim:

1. A method for migrating a file in a storage device, wherein the file includes a plurality of data blocks, the method performed by the storage device comprising:
   obtaining a snapshot of metadata of the file stored in the storage device, wherein the snapshot includes logical addresses of the data blocks and first write time points of the data blocks, and wherein each first write time point indicates a first point in time when a corresponding data block was written into the storage device;
   identifying a logical address of a target data block and a first write time point of the target data block from the snapshot, wherein the target data block is one of the plurality of the data blocks;
   obtaining, from the metadata of the file, a second write time point corresponding to the logical address of the target data block, wherein the metadata comprises the logical address of the target data block and the second write time point, and wherein the second write time point indicates a latest time point of writing the target data block into the storage device;
   determining that the first write time point is identical to the second write time point;
   performing a lock operation on the logical address of the target data block and the second write time point, such that after the lock operation is performed, the logical address of the target data block and the second write time point cannot be modified;
   migrating the target data block to a pre-allocated continuous storage space, wherein a size of the pre-allocated continuous storage space is greater or equal to a size of the file; and
   after migrating the target data block in the pre-allocated continuous storage space, performing an unlock operation on the logical address of the target data block and the second write time point, such that after the unlock operation is performed, the logical address of the target data block and the second write time point can be modified,
   wherein during the period after the lock operation is performed on the logical address of the target data block and the second write time point and until after the unlock operation is performed on the logical address of the target data block and the second write time point, a plurality of data blocks included in the file, other than the target data block, are modifiable to the storage device.

2. The method according to claim 1, wherein migrating the target data block to the pre-allocated continuous storage space further comprises:
   allocating a physical address in the pre-allocated continuous storage space; and
   migrating the target data block to the pre-allocated continuous storage space corresponding to the physical address.

3. The method according to claim 2 further comprises:
   storing the physical address and a new write time point of writing the target data block into the pre-allocated continuous storage space.

4. The method according to claim 1, wherein obtaining the snapshot of the metadata of the file comprises:
   obtaining the snapshot of the metadata of the file at a preset time or in response to receiving a file migration instruction.

5. The method of claim 1, wherein migrating the target data block to the pre-allocated continuous storage space corresponds to a disk defragmentation process.

6. A storage device comprising:
   a memory for storing metadata corresponding to a file that includes a plurality of data blocks; and
   a processor configured to:
     obtain a snapshot of the metadata, wherein the snapshot comprises logical addresses of the data blocks and first write time points of the data blocks, and wherein each first write time point indicates a first point in time when a corresponding data block is written into the storage device;
     identify a logical address of a target data block and a first write time point of the target data block from the snapshot, wherein the target data block is one of the plurality of the data blocks;
     obtain, from the metadata of the file, a second write time point corresponding to the logical address of the target data block, wherein the metadata comprises the logical address of the target data block and the second write time point, and wherein the second write time point indicates a latest time point of writing the target data block into the storage device;
     determine that the first write time point of the target data block is equal to the second write time point;
     perform a lock operation on the logical address of the target data block and the second write time point, such that after the lock operation is performed, the logical address of the target data block and the second write time point cannot be modified;
     migrate the target data block to a pre-allocated continuous storage space based on determining that the first write time point of the target data block is equal to the second write time point; and
     after migrating the target data block in the pre-allocated continuous storage space, perform an unlock operation on the logical address of the target data block and the second write time point, such that after the unlock operation is performed, the logical address of the target data block and the second write time point can be modified,
     wherein during the period after the lock operation is performed on the logical address of the target data block and the second write time point and until after the unlock operation is performed on the logical address of the target data block and the second write time point a plurality of data blocks included in the file, other than the target data block, are modifiable to the storage device.

7. The device according to claim 6, wherein a size of the pre-allocated continuous storage space is greater or equal to a size of the file.

8. The device according to claim 7, wherein the processor is further configured to:
   allocate a physical address in the pre-allocated continuous storage space; and
   migrate the target data block to the pre-allocated continuous storage space corresponding to the physical address.

9. The device according to claim 8, wherein the processor is further configured to:
   store the physical address and a new write time point of writing the target data block into the pre-allocated continuous storage space according to the physical address.

10. The device according to claim 6, wherein the processor is configured to obtain the snapshot of the metadata of the file at a preset time or in response to receiving a file migration instruction.

11. The device according to claim 6, wherein migrating the target data block to the pre-allocated continuous storage space corresponds to a disk defragmentation process.

12. A non-transitory computer-readable storage medium comprising instructions that, when executed by a processor, cause the processor to carry out the following steps:
- obtaining a snapshot of metadata of a file including a plurality of data blocks stored in a storage device, wherein the snapshot includes logical addresses of the data blocks and first write time points of the data blocks, and wherein each first write time point indicates a first point in time when a corresponding data block was written into the storage device;
- identifying a logical address of a target data block and a first write time point of the target data block from the snapshot, wherein the target data block is one of the plurality of data blocks;
- obtaining, from the metadata of the file, a second write time point corresponding to the logical address of the target data block, wherein the metadata comprises the logical address of the target data block and the second write time point, and wherein the second write time point indicates a latest time point of writing the target data block into the storage device;
- determining that the first write time point is identical to the second write time point;
- performing a lock operation on the logical address of the target data block and the second write time point, such that after the lock operation is performed, the logical address of the target data block and the second write time point cannot be modified;
- migrating the target data block to a pre-allocated continuous storage space, wherein a size of the pre-allocated continuous storage space is greater or equal to a size of the file; and
- after migrating the target data block in the pre-allocated continuous storage space, performing an unlock operation on the logical address of the target data block and the second write time point, such that after the unlock operation is performed, the logical address of the target data block and the second write time point can be modified,
- wherein during the period after the lock operation is performed on the logical address of the target data block and the second write time point and until after the unlock operation is performed on the logical address of the target data block and the second write time point, a plurality of data blocks included in the file, other than the target data block, are modifiable to the storage device.

13. The non-transitory computer-readable storage medium according to claim 12, wherein migrating the target data block to the pre-allocated continuous storage space comprises:
- allocating a physical address in the pre-allocated continuous storage space; and
- migrating the target data block to the pre-allocated continuous storage space corresponding to the physical address.

14. The non-transitory computer-readable storage medium according to claim 13, further comprising:
- storing the physical address and a new write time point of writing the target data block into the pre-allocated continuous storage space.

15. The non-transitory computer-readable storage medium according to claim 12, wherein obtaining the snapshot of the metadata of the file comprises:
- obtaining the snapshot of the metadata of the file at a preset time or in response to receiving a file migration instruction.

* * * * *